(No Model.)
F. W. SCHULTZ.
WIRE SOLDER MACHINE.
No. 534,054. Patented Feb. 12, 1895.
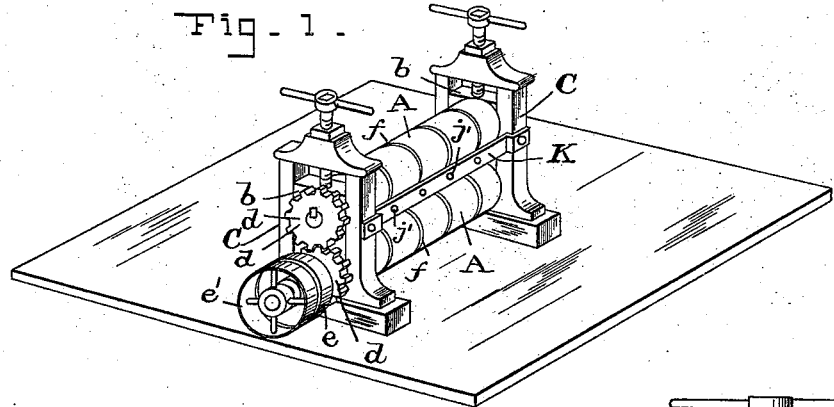
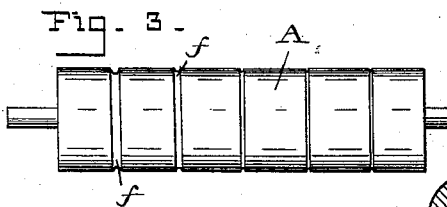
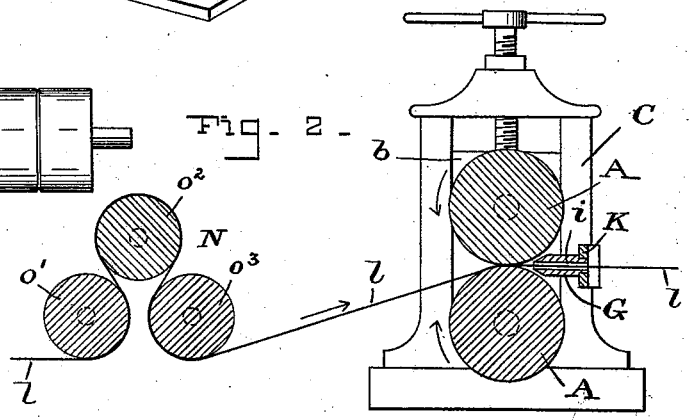
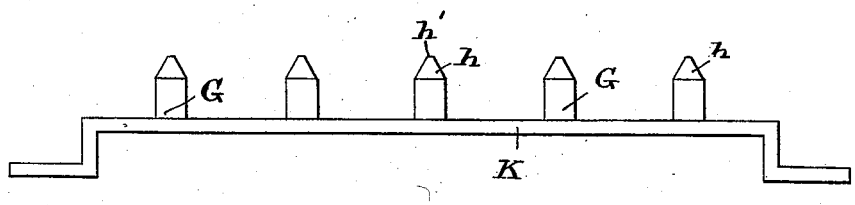
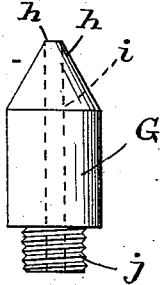
WITNESSES:—
L. I. Van Horn.
Charles B. Mann Jr.
INVENTOR:—
F. W. Schultz
By Chas. B. Mann
ATTORNEY.

UNITED STATES PATENT OFFICE.

FREDERICK W. SCHULTZ, OF BALTIMORE, MARYLAND.

WIRE-SOLDER MACHINE.

SPECIFICATION forming part of Letters Patent No. 534,054, dated February 12, 1895.

Application filed June 21, 1894. Serial No. 515,213. (No model.)

*To all whom it may concern:*

Be it known that I, FREDERICK W. SCHULTZ, a citizen of the United States, residing at Baltimore, in the State of Maryland, have invented certain new and useful Improvements in Wire-Solder Machines, of which the following is a specification.

This invention relates to a machine employed in the manufacture of wire solder.

The object of the invention is to provide means for imparting to the wire solder continuous uniformity in size, and also smoothness of surface.

As illustrating the first step in the manufacture of wire solder, I refer to Letters-Patent of the United States No. 405,914, granted to me June 25, 1889. The product of wire solder from this as well as all other machines of which I have any knowledge, has, in a certain degree, a want of uniformity in size of the wire, that is, it will be a little irregular in size, and also has a surface more or less rough. By the use of the machine which is the subject of my present invention, these imperfections in the wire solder are remedied.

The invention is illustrated in the accompanying drawings, in which—

Figure 1 is a perspective view of a machine embodying my invention. Fig. 2 is a vertical section of the machine. Fig. 3 is a side view of one of the grooved rollers. Fig. 4 is a plan or top view of the bar which holds the dies. Fig. 5 is a view on a larger scale of one of the wire solder dies.

The machine comprises two grooved rollers, A, which are mounted in bearings, b, in the frames, C. The shaft of each roller has a gear wheel, d, and these two wheels are engaged. Suitable provision is made for driving one of the rollers whereupon the other roller also will revolve. In the drawings one roller is shown to be provided with fast and loose pulleys, e, e'. Obviously other provision could be made for imparting rotary motion to the rollers. The rollers may have one or more grooves, f, extending around them. In the present instance several grooves are shown of varying size, so as to be adapted for solder wire of different gage. The function of the rollers is to draw the wire solder.

A cutter or die, G, is secured in position close to the bite of the two rollers and at the delivery side of the rollers and as the wire is drawn by the rollers this cutter takes off the "skin" of the solder wire reducing all its irregularities to a perfectly uniform size, and at the same time making its surface smooth.

The cutter or die which I prefer is plainly shown in Fig. 5. It has a tapered or cone-shaped point or end, h, made of steel with a bore or hole, i, extending axially or centrally through it. In Fig. 2 this bore or hole is shown and in Fig. 5 it is indicated by two parallel broken lines. The cutter or die is sharpened by grinding the tapered or cone part, h, so as to have the circular edge, h', sharp. The opposite end of the cutter block has a screw-thread, j, by which it is secured in position. In this instance a holder bar, K, is attached to the frame, C, and the bar has a hole, j', through it and the cutter or die, G, has its screw-threaded end, j, entered in said hole in the bar. Thus the bore or hole, i, through the die is left unobstructed for the passage of the solder wire.

It will be seen by reference to Fig. 2, that the tapered or cone-shaped point, h, of the cutter has its position adjoining the meeting line or "bite" of the two grooved rollers, A at that end of the rollers at which the wire discharges. The wire, l, passes between the two rollers and fits in the grooves, f, thereof, and as the wire is drawn by the rollers, it is forced through the bore, i, of the cutting die, the sharp circular edge, h', of which shaves off the "skin" of the wire and thereby removes all the roughness of surface which has heretofore been an objection, and makes it smooth and bright, and also insures the wire to have a continuous uniform size.

In the present instance the bar, K, extends parallel with the rollers and has a number of holes, j', which are located so as to be in position coincident with the grooves, f, on the rollers. By this construction a die or cutter, G, having a bore of suitable size for each size of groove, f, may be attached to the bar, K, and the machine may thus turn out finished solder wire of any desired size.

A tension device, N, co-acts with the machine to keep the soft solder wire stretched and to guide it as it passes to the grooves of the rollers. In the present instance this tension device is shown to be constructed of three rollers, $o'$, $o^2$, $o^3$, suitably mounted and the wire, $l$, passes under the first roller, up and over the second roller, then down and under the third roller and thence it passes between the two grooved rollers, A. As these two rollers draw the wire from the tension roller device, the latter offers a certain resistance which keeps the wire taut and prevents it from doubling or kinking as it feeds to the grooved rollers, A, and thus the latter rollers and cutter, G, are enabled to do good work rapidly.

Having thus described my invention, what I claim as new, and desire to secure by Letters Patent, is—

1. In a device for removing the irregularities of surface from solder wire and reducing the wire to a perfectly uniform size, the combination of a suitable frame carrying two rollers, A, having a number of grooves of varying sizes, said rollers serving to draw the solder wire; a bar, K, extending parallel with the rollers across the said frame and provided with holes, $j'$, in position coincident with the said grooves on the rollers; and one or more cutters or dies each having a screw-threaded end secured in the said holes of the bar and a central hole through which the wire passes, and a cone-shaped point forming a circular cutting edge, for the purpose described.

2. In a device of the class described, the combination of a suitable frame carrying two grooved rollers to draw solder wire; a cutter or die having a cone-shaped point forming a cutting edge, said cone-point having position at the delivery side of the rollers adjoining the "bite" between the rollers; and a tension device to act on the solder wire as it feeds to said rollers.

3. In a device of the class described, the combination of a suitable frame carrying two grooved rollers to draw solder wire; and a cutter or die having a central hole through which the wire passes and provided with a tapering or cone-shaped point forming a circular cutting edge which removes the irregularities of surface from the wire,—said cone-shaped point having position adjoining the line of "bite" of said rollers, substantially as and for the purpose described.

In testimony whereof I affix my signature in the presence of two witnesses.

FREDERICK W. SCHULTZ.

Witnesses:
   CHARLES C. STACK,
   B. V. RICHARDSON, Jr.